US012322239B2

(12) United States Patent
Kroon

(10) Patent No.: US 12,322,239 B2
(45) **Date of Patent: *Jun. 3, 2025**

(54) ELECTRONIC GAMING SYSTEM AND METHOD OF PROVIDING A FEATURE GAME WITH REPLACED REELS

(71) Applicant: Aristocrat Technologies Australia Pty Limited, North Ryde (AU)

(72) Inventor: James Kroon, North Ryde (AU)

(73) Assignee: Aristocrat Technologies Australia Pty Limited, North Ryde (AU)

( * ) Notice: Subject to any disclaimer, the term of this patent is extended or adjusted under 35 U.S.C. 154(b) by 0 days.

This patent is subject to a terminal disclaimer.

(21) Appl. No.: 17/827,430

(22) Filed: May 27, 2022

(65) Prior Publication Data

US 2022/0292914 A1 Sep. 15, 2022

Related U.S. Application Data

(63) Continuation of application No. 16/875,691, filed on May 15, 2020, now Pat. No. 11,348,401, which is a (Continued)

(30) Foreign Application Priority Data

Jun. 9, 2015 (AU) ................................ 2015902143

(51) Int. Cl.
*G07F 17/32* (2006.01)
*G07F 17/34* (2006.01)

(52) U.S. Cl.
CPC ...... *G07F 17/3213* (2013.01); *G07F 17/3209* (2013.01); *G07F 17/3211* (2013.01); (Continued)

(58) Field of Classification Search
CPC .. G07F 17/34; G07F 17/3262; G07F 17/3213; G07F 17/326; G07F 17/3267; G07F 17/3258
See application file for complete search history.

(56) References Cited

U.S. PATENT DOCUMENTS 6,186,894 B1 * 2/2001 Mayeroff ................ G07F 17/34 463/16
8,216,061 B2 7/2012 Pacey
(Continued)

FOREIGN PATENT DOCUMENTS

WO 2008027429 A2 3/2008

OTHER PUBLICATIONS

Office Action dated Jun. 9, 2021 for U.S. Appl. No. 16/875,691 (pp. 1-10).

(Continued)

*Primary Examiner* — Justin L Myhr
(74) *Attorney, Agent, or Firm* — Armstrong Teasdale LLP

(57) ABSTRACT

A method of conducting a wagering game includes: conducting a base game on an electronic gaming machine; detecting a first trigger condition in the base game; initiating a feature game in response to the first trigger condition; detecting a second trigger condition in the feature game; granting access to a plurality of bonus feature game levels in response to the second trigger condition; and determining an outcome of the feature game.

19 Claims, 5 Drawing Sheets

Related U.S. Application Data continuation of application No. 16/170,667, filed on Oct. 25, 2018, now Pat. No. 10,657,760, which is a continuation of application No. 15/178,055, filed on Jun. 9, 2016, now Pat. No. 10,140,805.

(52) U.S. Cl.
CPC ........ *G07F 17/3227* (2013.01); *G07F 17/323* (2013.01); *G07F 17/3246* (2013.01); *G07F 17/3251* (2013.01); *G07F 17/3267* (2013.01); *G07F 17/34* (2013.01)

(56) References Cited

U.S. PATENT DOCUMENTS

| | | | | |
|---|---|---|---|---|
| 8,512,131 | B2 | 8/2013 | Iddings | |
| 8,591,317 | B2 | 11/2013 | Mclaughlin | |
| 8,647,188 | B2 | 2/2014 | Kelly | |
| 8,690,658 | B2 | 4/2014 | Pacey | |
| 2003/0013513 | A1 | 1/2003 | Rowe | |
| 2003/0222402 | A1 | 12/2003 | Olive | |
| 2005/0239539 | A1 | 10/2005 | Inamura | |
| 2005/0288093 | A1 | 12/2005 | Englman | |
| 2006/0040728 | A1 | 2/2006 | Fuller | |
| 2006/0189377 | A1 | 8/2006 | Gomez | |
| 2006/0287036 | A1 | 12/2006 | Daly | |
| 2007/0015585 | A1 | 1/2007 | Sartini | |
| 2007/0060295 | A1 | 3/2007 | Demar | |
| 2008/0039194 | A1 | 2/2008 | Walther | |
| 2008/0146319 | A1 | 6/2008 | Yoshizawa | |
| 2009/0111564 | A1 | 4/2009 | Smith | |
| 2009/0239649 | A1 | 9/2009 | Yoshizawa | |
| 2010/0203948 | A1 | 8/2010 | Falciglia, Sr. | |
| 2010/0331072 | A1 | 12/2010 | Wiryadi | |
| 2012/0172107 | A1 * | 7/2012 | Acres | G07F 17/34 463/16 |
| 2012/0214581 | A1 | 8/2012 | Pacey | |
| 2012/0289322 | A1 | 11/2012 | Causley | |
| 2013/0237306 | A1 | 9/2013 | Meyer | |
| 2013/0237312 | A1 | 9/2013 | Palmisano | |
| 2014/0135096 | A1 | 5/2014 | Aida | |
| 2014/0256402 | A1 | 9/2014 | Caputo | |
| 2015/0031442 | A1 | 1/2015 | Colvin | |
| 2015/0105141 | A1 | 4/2015 | Pacey | |

OTHER PUBLICATIONS

Office Action (Final Rejection) dated Nov. 17, 2021 for U.S. Appl. No. 16/875,691 (pp. 1-6).
Office Action (Notice of Allowance and Fees Due (PTOL-85)) dated Jan. 31, 2022 for U.S. Appl. No. 16/875,691 (pp. 1-8).

* cited by examiner

ELECTRONIC GAMING SYSTEM AND METHOD OF PROVIDING A FEATURE GAME WITH REPLACED REELS

CROSS REFERENCE TO RELATED APPLICATIONS

This application is a continuation of and claims priority to U.S. patent application Ser. No. 16/875,691, filed May 15, 2020, which is a continuation of U.S. patent application Ser. No. 16/170,667, now U.S. Pat. No. 10,657,760, filed Oct. 25, 2018, which is a continuation of U.S. patent application Ser. No. 15/178,055, now U.S. Pat. No. 10,140,805, filed Jun. 9, 2016, which claims priority to Australian Provisional Patent Application No. 2015902143, filed Jun. 9, 2015, all of which are hereby incorporated by reference in their entireties.

BACKGROUND OF THE DISCLOSURE

The present invention relates to a gaming system, a method of gaming, a game controller and computer program code.

It is known to provide a gaming system which comprises a game controller arranged to randomly display several symbols from a predetermined set of symbols and to determine a game outcome such as a game win based on the displayed symbols. Such gaming systems may commonly be implemented as a stepper machine provided with reels with each reel carrying several symbols of the set, or a video machine wherein selected symbols are displayed on virtual reels on a video display.

While such gaming systems provide users with enjoyment, a need exists for alternative gaming systems in order to maintain or increase player enjoyment.

BRIEF DESCRIPTION OF THE DISCLOSURE

In accordance with a first aspect of the present invention, there is provided a method of gaming comprising: conducting play of a game; awarding eligibility to a feature game in response to a first trigger condition being met in relation to the game; conducting play of the feature game; awarding eligibility to access a number of bonus feature game levels in response to a second trigger condition being met in relation to the feature game (though it should be noted that eligibility to access the bonus feature game levels does not ensure that they will in fact be accessed, which will depend on game round outcomes); and determining an outcome of the play of the feature game.

In accordance with a second aspect of the present invention, there is provided a game controller for a gaming system, the game controller arranged to: conduct play of a game; award eligibility to a feature game in response to a first trigger condition being met in relation to the game; conduct play of the feature game; award eligibility to access a number of bonus feature game levels in response to a second trigger condition being met in relation to the feature game; and determine an outcome of the play of the feature game.

In accordance with a third aspect of the present invention, there is provided a gaming system comprising: a player interface comprising a display for displaying game outcomes to a player; and a game controller arranged to: conduct play of a game; award eligibility to a feature game in response to a first trigger condition being met in relation to the game; conduct play of the feature game; award eligibility to access a number of bonus feature game levels in response to a second trigger condition being met in relation to the feature game; and determine an outcome of the play of the feature game.

It should be noted that any of the various individual features of each of the above aspects of the invention, and any of the various individual features of the embodiments described herein, including in the claims, can be combined as suitable and desired.

BRIEF DESCRIPTION OF THE DRAWINGS

In order that the invention may be more clearly ascertained, embodiments will now be described, by way of example, with reference to the accompanying drawing, in which.

DETAILED DESCRIPTION OF THE DISCLOSURE

According to embodiments of the invention there is provided a gaming system in which a player plays a spinning reel type game or games. An award is determined for the game or games. The reels spin about an axis in a conventional manner to display a sequence of symbols and in due course may form a winning pattern (such as a win line). According to embodiments of the present invention, the reels are each of apparent three-dimensional, torus form. In one example, the torus has a circular cross section, and in another example a square cross section. It will be appreciated, however, that essentially any cross section can be used provided it is suitable for displaying the symbols.

The gaming system may be provided in a number of different forms. In one embodiment, a stand-alone gaming machine is provided in which all or most components required for implementing the game are present in a player operable gaming machine.

In a second embodiment, a distributed architecture is provided wherein some of the components required for implementing the game are present in a player operable gaming machine and some of the components required for implementing the game are located remotely relative to the gaming machine. For example, a "thick client" architecture may be used wherein part of the game is executed on a player operable gaming machine and part of the game is executed remotely, such as by a gaming server; or a "thin client" architecture may be used wherein most of the game is executed remotely such as by a gaming server and a player operable gaming machine is used only to display audible and/or visible gaming information to the player and receive gaming inputs from the player.

However, it will be understood that other arrangements are envisaged. For example, an architecture may be provided wherein a gaming machine is networked to a gaming server and the respective functions of the gaming machine and the gaming server are selectively modifiable. For example, the gaming system may operate in stand alone gaming machine mode, "thick client" mode or "thin client" mode depending on the game being played, operating conditions, and so on. Other variations will be apparent to persons skilled in the art.

Figure 1:
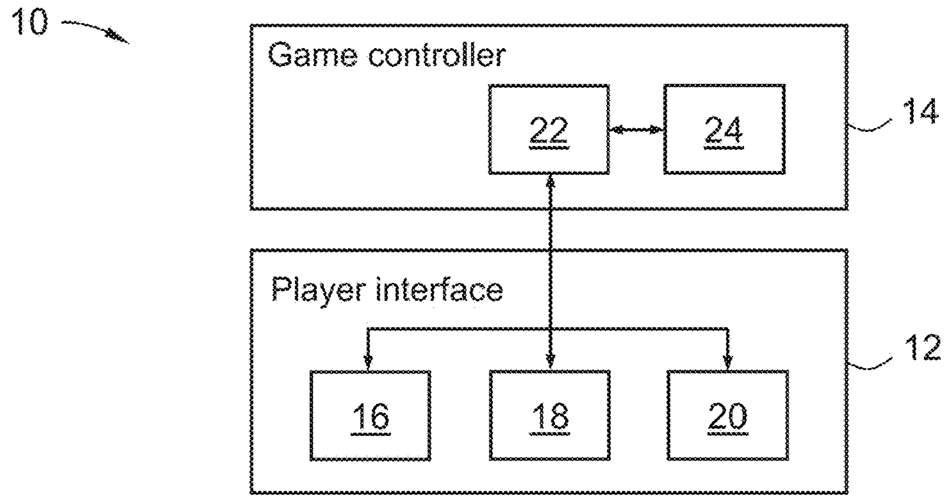
FIG. 1 is a block diagram of exemplary core components of a gaming system.

Irrespective of the form, the gaming system includes several core components. Referring to FIG. 1, at the broadest level the core components include a player interface 12 and a game controller 14, as illustrated schematically at 10 in FIG. 1.

In the exemplary embodiment, player interface 12 is arranged to enable manual interaction between a player and the gaming system and for this purpose includes the input/output components required for the player to enter instructions and play the game. Components of the player interface may vary from embodiment to embodiment, but will typically include a credit mechanism 16 to enable a player to input credits and receive payouts, one or more displays 18 and a game play mechanism 20 that enables a player to input game play instructions.

Game controller 14 is in data communication with player interface 12 and typically includes a processor 22 that processes the game play instructions in accordance with game play rules and outputs game play outcomes to at least one display 18. Typically, the game play instructions are stored as program code in a memory 24, but can also be hardwired. Herein the term "processor" is used to refer generically to any device that can process game play instructions in accordance with game play rules and may include: a microprocessor, microcontroller, programmable logic device or other computational device, a general purpose computer (e.g. a PC) or a server.

Figure 2:
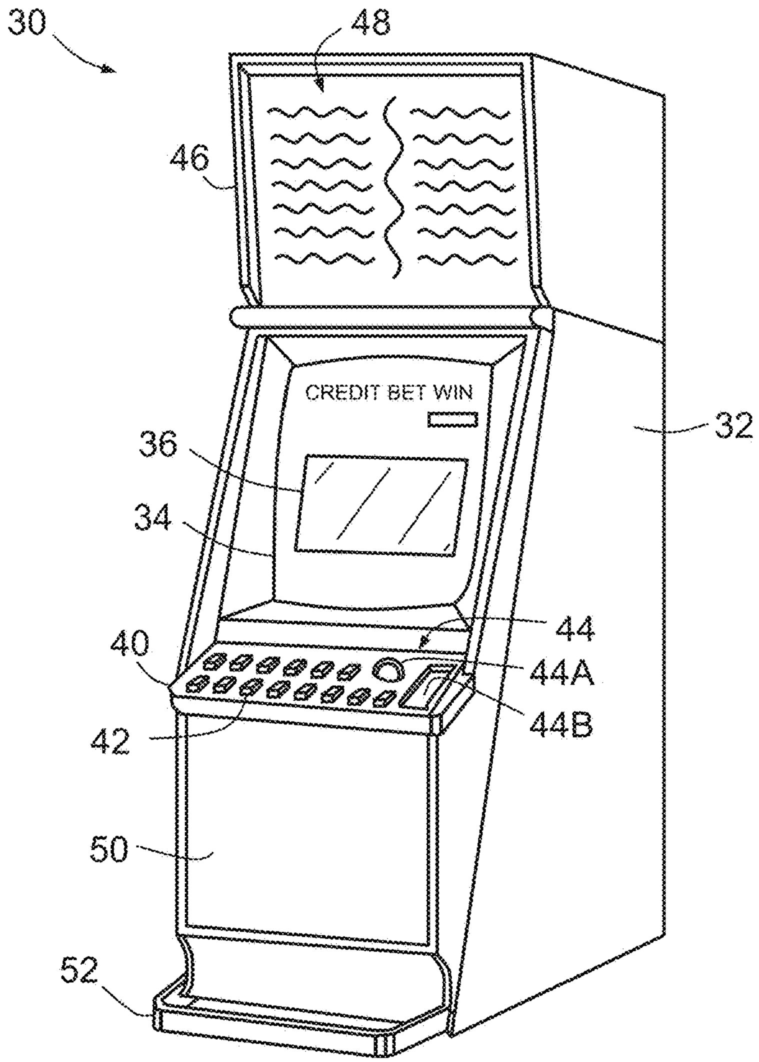
FIG. 2 is a schematic view of an exemplary gaming machine that may be used with the gaming system shown in FIG. 1.

FIG. 2 illustrates a schematic view of an exemplary gaming system in the form of a stand alone gaming machine 30. In the exemplary embodiment, gaming machine 30 includes a console 32 including a display 34 that displays representations of a game 36 that can be played by a player. A mid-trim 40 of the gaming machine 30 houses a bank of buttons 42 that enable a player to interact with gaming machine 30, in particular during game play. Mid-trim 40 also houses a credit input mechanism 44 that, in this example, includes a coin input chute 44A and a bill collector 44B. Other credit input mechanisms (not shown) may also be employed, such as a card reader for reading a smart card, debit card or credit card. A player marketing module (not shown) having a reading device may also be provided for the purpose of reading a player tracking device, for example as part of a loyalty program. The player tracking device may be in the form of a card, flash drive or any other portable storage medium capable of being read by the reading device.

A top box 46 may carry artwork 48 including, for example, pay tables and details of bonus awards and other information or images relating to the game. Further artwork and/or information may be provided on a front panel 50 of the console 32. A coin tray 52 is mounted beneath front panel 50 for dispensing cash payouts from gaming machine 30.

In the exemplary embodiment, display 34 of gaming machine 30 is in the form of a video display unit, particularly a cathode ray tube screen device. Alternatively, display 34 may be a liquid crystal display, plasma screen, any other suitable video display unit, or the visible portion of an electromechanical device. Top box 46 may also include a display, such as a video display unit, which may be of the same type as the display 34, or of a different type.

Figure 3:
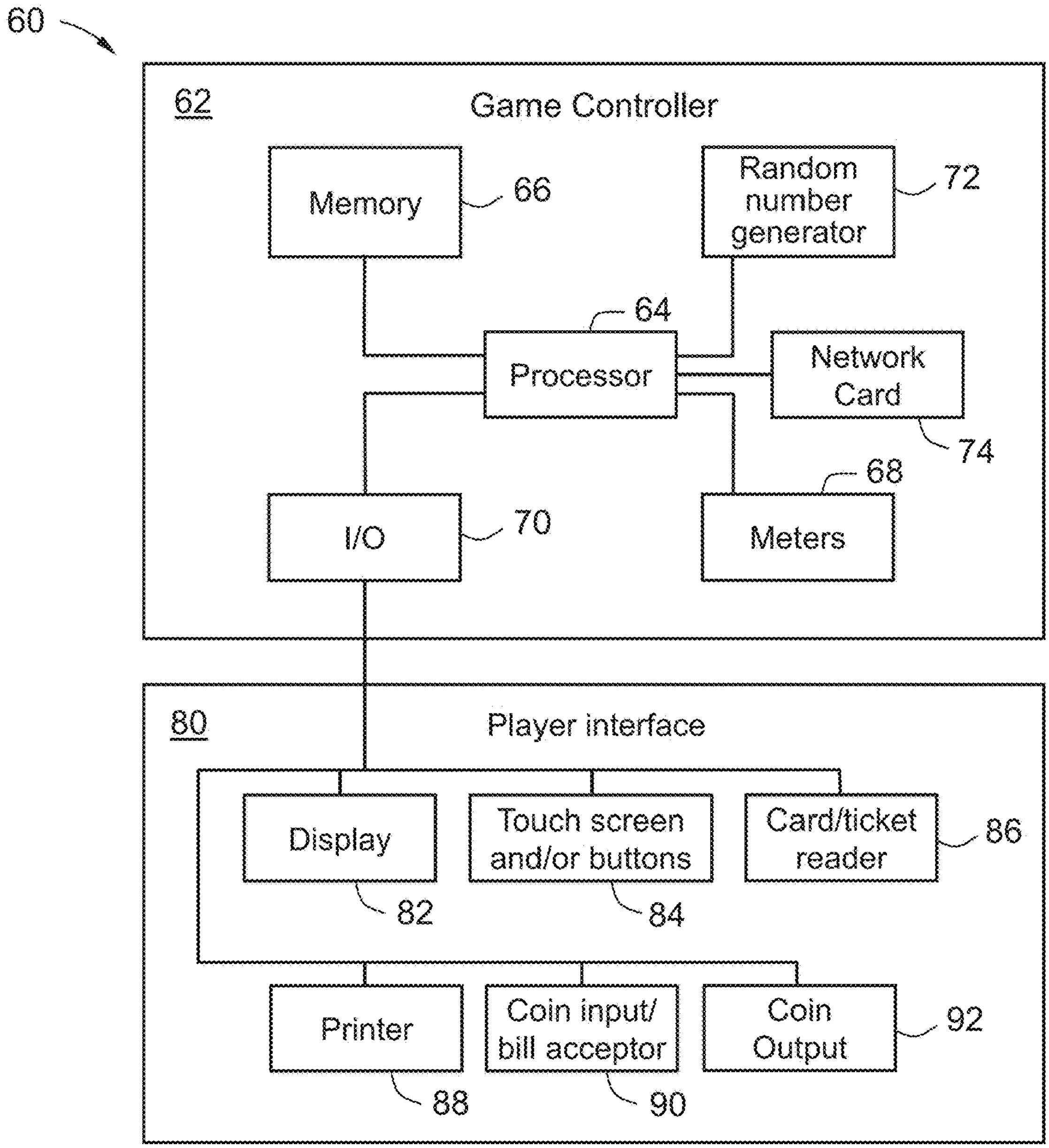
FIG. 3 is a block diagram of exemplary functional components of a gaming machine, such as the gaming machine shown in FIG. 2.

FIG. 3 is a schematic block diagram of an exemplary gaming machine 60, in which only the operative components are shown for clarity. Gaming machine 60 may be the same as or different from gaming machine 30 (shown in FIG. 2). Gaming machine 60 includes a game controller 62 including a processor 64. Instructions and data to control operation of processor 64 are stored in a memory 66 that is in data communication with processor 64. Typically, gaming machine 60 includes both volatile and non-volatile memory and more than one of each type of memory, with such memories being collectively represented by memory 66.

Gaming machine 60 includes hardware meters 68 that ensure regulatory compliance and monitoring player credit, and an input/output (I/O) interface 70 for communicating with peripheral devices of gaming machine 60, for example. Input/output interface 70 and/or the peripheral devices may be intelligent devices with their own memory for storing associated instructions and data for use with the input/output interface 70 and/or the peripheral devices.

Gaming machine 60 also includes a random number generator 72 that generates random numbers for use by processor 64. Persons skilled in the art will appreciate that the reference to random numbers includes pseudo-random numbers. In addition, in the exemplary embodiment, gaming machine 60 includes a communications interface, such as, for example a network card 74 that transmits status information, accounting information and/or other gaming information to a central controller, server and/or database, and that receives data or commands from the central controller, server and/or database.

FIG. 3 is a block diagram of exemplary functional components of gaming machine 60. More specifically, in the exemplary embodiment, gaming machine 60 includes a player interface 80 that includes peripheral devices that communicate with game controller 62. These peripheral devices include one or more displays 82, a touch screen and buttons (including a PLAY button) 84, a card and/or ticket reader 86, a printer 88, a bill acceptor and/or coin input mechanism 90 and a coin output mechanism 92. Additional hardware may be included as part of the gaming machine 60, or hardware may be omitted as required for the specific implementation.

Figure 4:
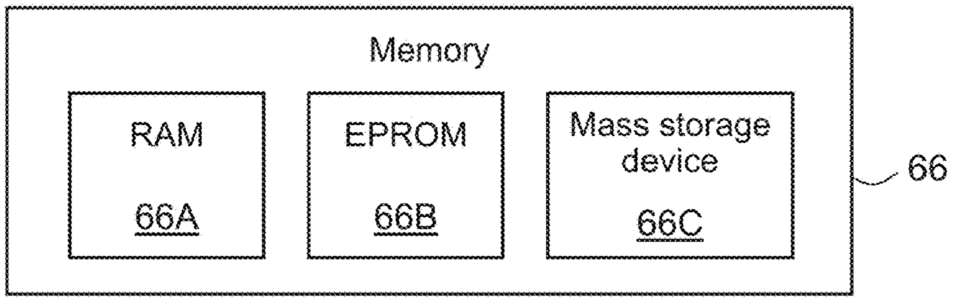
FIG. 4 is a block diagram representing an exemplary structure of a memory that may be used with the gaming system shown in FIG. 1.

FIG. 4 is a block diagram of exemplary main components of memory 66. In the exemplary embodiment, memory 66 includes RAM 66A, EPROM 66B and a mass storage device 66C. RAM 66A typically temporarily holds program files for execution by processor 64 and related data. EPROM 66B may be a boot ROM device and/or may contain some system or game related code. Mass storage device 66C is typically used to store game programs, the integrity of which may be verified and/or authenticated by processor 64 using protected code from EPROM 66B or elsewhere. In other embodiments, operative components of gaming machine 60 may be distributed. For example, in other embodiments, any of input/output devices 82, 84, 86, 88, 90, and/or 92 may be remote from game controller 62.

Figure 5:
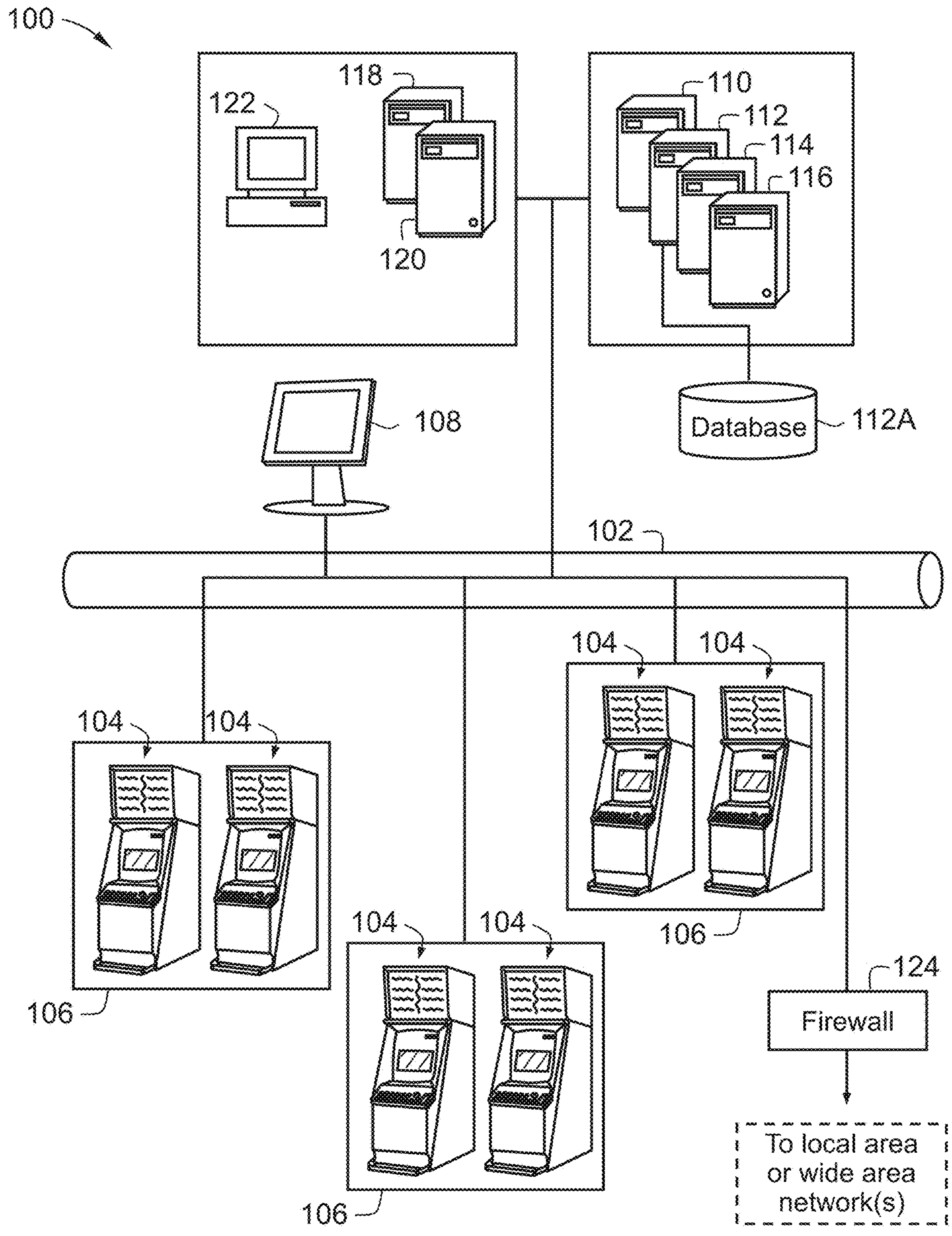
FIG. 5 is a schematic illustration of an exemplary networked gaming system.

FIG. 5 is a schematic illustration of an exemplary networked gaming system 100. In the exemplary embodiment, gaming system 100 includes a network 102 that may be, for example, an Ethernet network. More specifically, in the exemplary embodiment, gaming machines 104, shown arranged in three banks 106 of two gaming machines 104, are connected to the network 102. Gaming machines 104 provide a player operable interface and may be the same as gaming machines 30 and/or 60 (shown in FIGS. 2 and 3, respectively), or may have simplified functionality depending on the requirements for implementing game play. While two banks 106 of gaming machines 30 are illustrated in FIG. 5, in other embodiments system 100 may include any number of banks including banks of one, three, or more than three gaming machines 30 are also envisaged.

One or more displays 108 may also be connected to the network 102. Displays 108 may, for example, be associated with one or more banks 106 of gaming machines 30. Displays 108 may be used to display representations associated with game play on gaming machines 104 and/or to display other representations, such as promotional or informational material.

In an exemplary thick client embodiment, game server 110 of gaming system 100 implements part of the game played by a player using a gaming machine 104, and gaming machine 104 implements part of the game. Within this embodiment, as both the game server and the gaming machine implement part of the game, they collectively provide a game controller. A database management server 112 may manage storage of game programs and associated data for downloading or access by gaming devices 104 in a database 112A. Typically, if the gaming system enables players to participate in a Jackpot game, a Jackpot server 114 will be provided to carry out the accounting in respect of the Jackpot game. A loyalty program server 116 may also be provided.

In an exemplary thin client embodiment, game server 110 implements most or all of the game played by a player using a gaming machine 104 and gaming machine 104 essentially provides only the player interface. Within such an embodiment, game server 110 provides the game controller. Gaming machine 104 receives player instructions, passes these to game server 110, which then processes them and returns game play outcomes to gaming machine 104 for display. In a thin client embodiment, gaming machines 104 may be computer terminals, such as PCs running software that provides a player interface operable using standard computer input and output components.

Servers are also typically provided to assist in the administration of gaming system 100 including, for example, a gaming floor management server 118, and a licensing server 120 to monitor the use of licenses relating to particular games. An administrator terminal 122 is provided to enable an administrator to run network 102 and the devices connected to the network.

Gaming system 100 may communicate with other gaming systems, with other local networks such as a corporate network, with a wide area network such as the Internet, for example through a firewall 124, or a combination of these.

Persons skilled in the art will appreciate that, in accordance with known techniques, functionality at the server side of gaming system 100 may be distributed over a plurality of different computers. For example, elements may be run as a single "engine" on one server or a separate server may be provided. For example, game server 110 could run a random generator engine. Alternatively, a separate random number generator server could be provided. Further, persons skilled in the art will appreciate that a plurality of games servers could be provided to run different games or a single game server may run a plurality of different games as required by the terminals.

Figure 6:
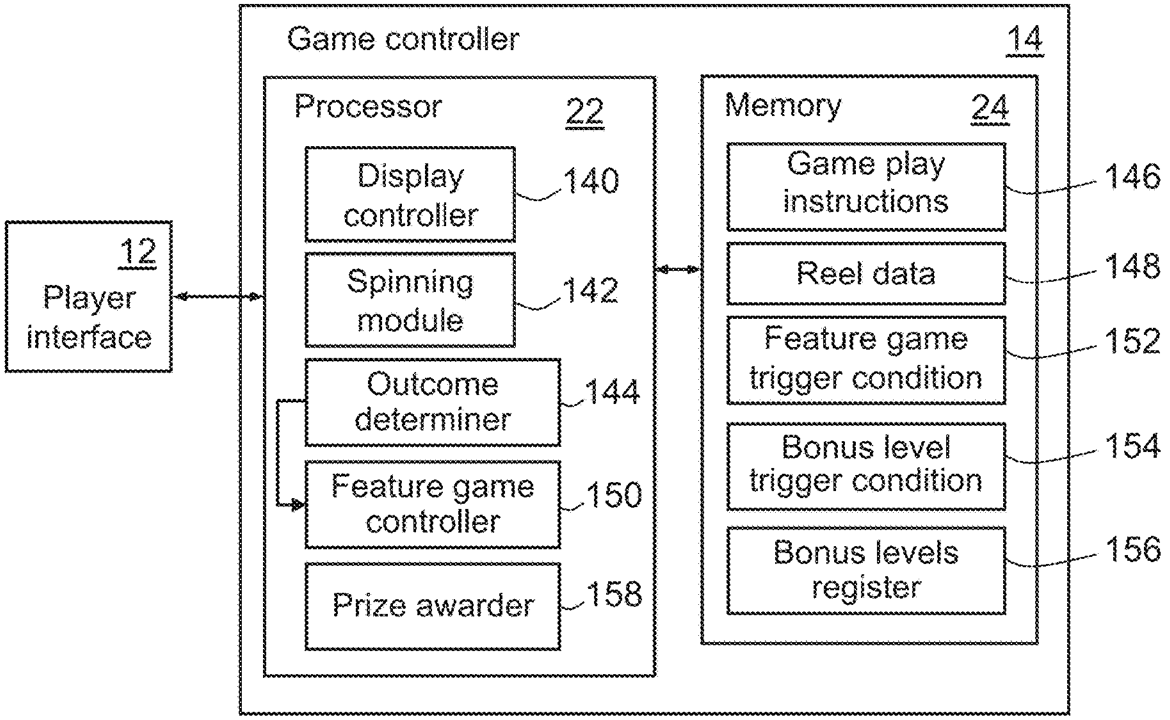
FIG. 6 is a schematic view of an exemplary game controller and player interface used with the gaming system of FIG. 1.

FIG. 6 is a schematic view of player interface 12 and a game controller 14. More specifically, processor 12 of game controller 14 includes a display controller 140, a spinning module 142, and an outcome determiner 144. Display controller 140 controls a view displayed on display 34 and/or 82 and spinning module 142 controls the manner in which reels are displayed when displayed to spin. Outcome determiner 144, which typically receives input from random number generator 72, determines game outcomes. Display controller 140, spinning module 142 and outcome determiner 144 cooperate to display and determine the outcome of a game.

Memory 24 includes game play instructions 146 that control the reels to be displayed to spin such that game symbols arranged along the reels are displayed as moving downwards in display 34 and 82, and reel data 148 including vertical symbol sequence data. The vertical symbol sequence data is indicative of the sequence in which game symbols are to be displayed along each of the reels, and can be encoded in any convenient way.

Processor 22 also includes a feature game controller 150 that determines when a player becomes eligible to be awarded a feature game, according to a trigger condition 152 stored in memory 24. In the exemplary embodiment, trigger condition 152 specifies that eligibility for a feature game is awarded if an outcome of a base game game round includes three or more left to right scatter symbols, that is, triggers the feature game. Moreover, in the exemplary embodiment, the scatter symbols include diverse gemstone symbols, such as a ruby symbol, an emerald symbol, a pink sapphire symbol, a topaz symbol and a sapphire symbol. Outcome determiner 144 awards a prize if a game round outcome includes a pay line with a predefined number of any of these scatter symbols. In addition to a game round outcome including three or more left to right scatter symbols triggers the feature game, regardless of the identity of the individual scatter symbols. Thus, in the exemplary embodiment, the combination from left to right of an emerald symbol, a topaz symbol, an emerald symbol, and a pink sapphire symbol would not result in the awarding of a prize, but would instead trigger the feature game.

Thus, if feature game controller 150 determines that feature game trigger condition 152 has been met, feature game controller 150 initiates a feature game, that, in the exemplary embodiment, includes seven game rounds that each include a number of feature game reels. Each game reel includes diamond symbols and credit prizes, and the initial number of reels depends on the trigger condition met. For example, feature game controller 150 sets the number of feature game reels to be the same as the number of scatter symbols aligned left to right that triggered the feature game. As three or more such aligned scatter symbols are required to trigger the feature game, in the exemplary embodiment there will be at least three reels in the feature game and at most five.

Figure 7:
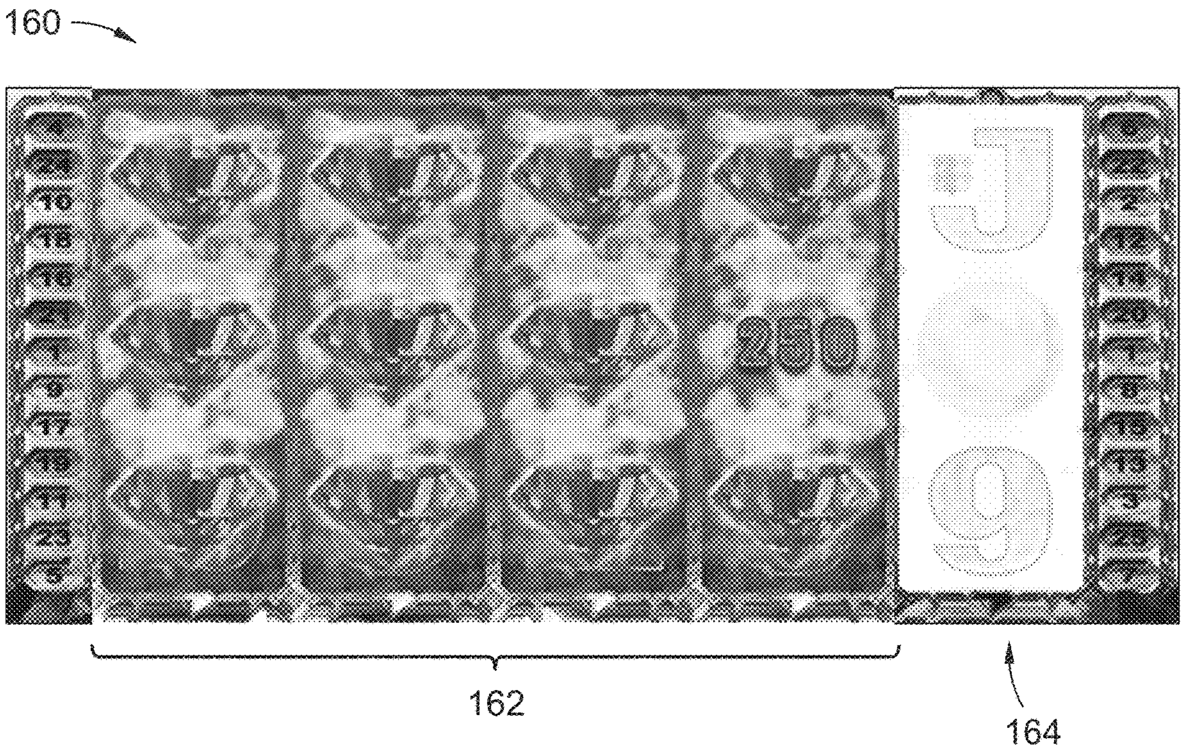
FIG. 7 is an exemplary display of an exemplary feature game round outcome that may be used with the gaming machine of FIG. 1.

FIG. 7 is a view of an exemplary feature game game round outcome 160 display. More specifically, in the exemplary embodiment, the trigger condition that gave the player eligibility to the feature game included four scatter symbols, and as such, four of the base game reels have been replaced by feature game reels 162 and the fifth base game reel 164 is inactive during the feature game, and as such, is darkened.

Each of the feature game reels, as explained above, include stacked diamond symbols and credit prizes. Numerous outcomes are possible, as will be appreciated by those in the art, but two outcomes (as determined by outcome determiner 144, when the player touches or presses PLAY button 84) in the exemplary embodiment, confer an award to the player:

i) each stack of three diamond symbols satisfies bonus level trigger condition 154, in which case, feature game controller 150 will unlock a feature game Bonus Level; and ii) each credit prize is awarded.

In the exemplary embodiment, outcome determiner 144 determines that there are three stacks of three diamond symbols and a credit prize of 250 credits. As such, feature game controller 150 unlocks (that is, gives the player eligibility to) three feature game Bonus Levels and causes a prize awarder 158 of processor 22 to award 250 credits.

In such an embodiment, feature game controller 150 may apply either of these awards according to the outcome of any of the feature game game rounds, and also subsequently applies any awarded feature game Bonus Levels to the remaining game round of the feature game. Hence, in the exemplary embodiment, feature game controller 150 will apply three Bonus Levels to all subsequent game rounds of the feature game (unless additional Bonus Levels are awarded in later game rounds, in which case the number of Bonus Levels will be incremented as appropriate).

The Bonus Levels, which are defined in a bonus levels register 156, of this embodiment when an ante bet was not made when the feature game was awarded are shown in Table 1:

TABLE 1

Bonus Levels without Ante Bet

| Bonus Level | Bonus Award |
|---|---|
| 1 | 5 extra game rounds |
| 2 | Pic4 and Pic5 pay the same as Pic1 |
| 3 | Pic2 and Pic3 pay the same as Pic1 |
| 4 | WILD and WILD substituting wins · 2 or · 3 |
| 5 | All Wins · 2 |

Pic1, Pic2, Pic3, Pic4 and Pic5 indicate different symbols, while WILD indicates a wildcard.

The Bonus Levels are awarded in succession (from Level 5 to Level 1), so the five extra game rounds will only be awarded if the player is awarded five Bonus Levels. If additional Bonus Levels are awarded (e.g. a sixth, seventh, etc.), an additional five extra game rounds are awarded each time.

In addition, if—when the feature game is awarded—the player makes an ante bet, feature game controller 150 initiates the feature game initially with 15 game rounds and employs a different set of Bonus Levels (also defined in bonus levels register 156) as shown in Table 2:

TABLE 2

Bonus Levels with Ante Bet

| Bonus Level | Bonus Award |
|---|---|
| 1 | 5 extra game rounds |
| 2 | A, K, Q, J, 10 and 9 pay the same as Pic1 |
| 3 | Pic2, Pic3, Pic4 and Pic5 pay the same as Pic1 |
| 4 | WILD and WILD substituting wins · 2, · 3 or · 5 |
| 5 | All Wins · 2 |

Figure 8:
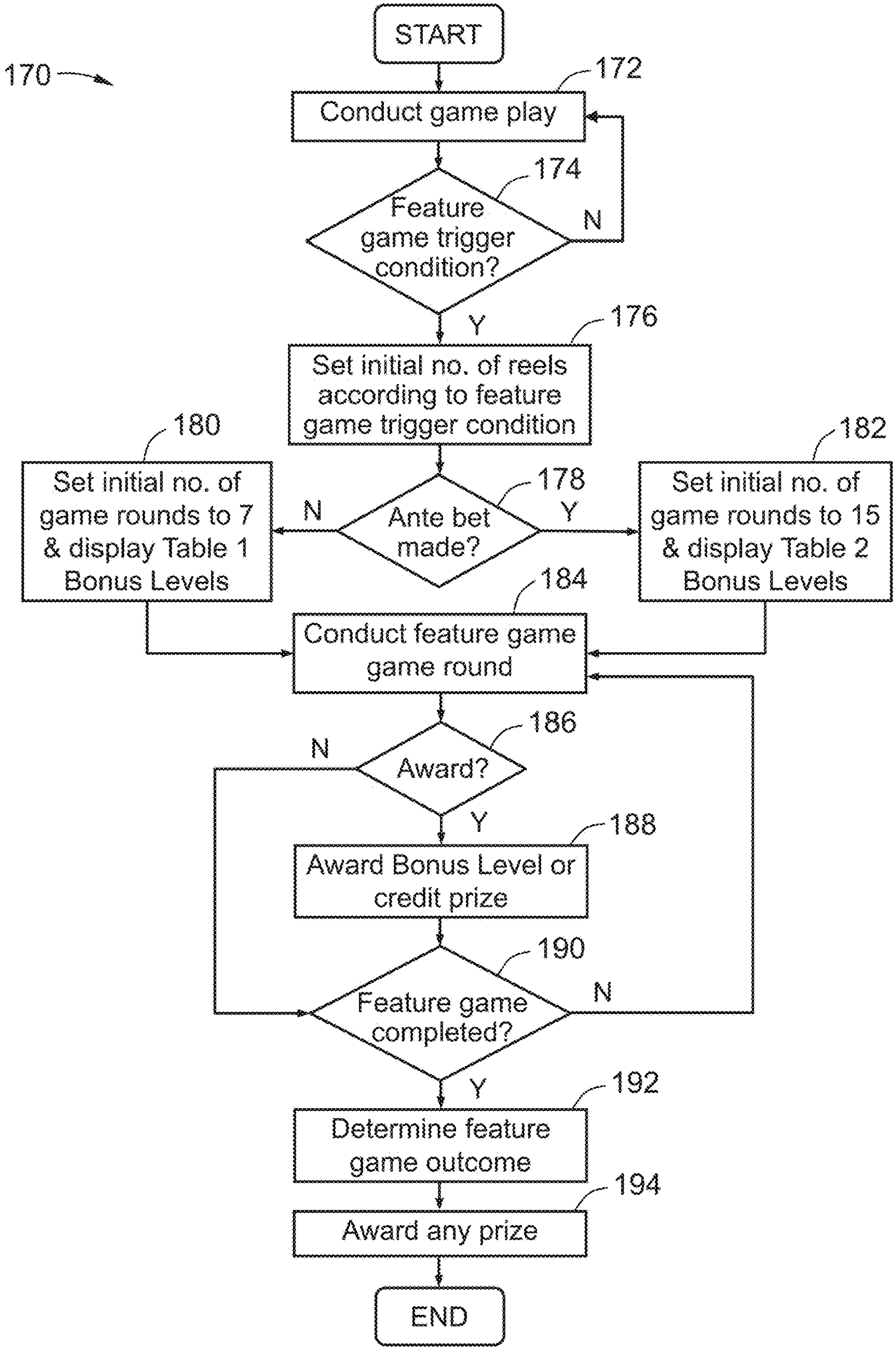
FIG. 8 is a flow diagram of an exemplary method of game play that may be implemented by the gaming system shown in FIG. 1.

FIG. 8 is a flow diagram of an exemplary method of game play that may be implemented. Initially, game play is conducted 172. Feature game controller 150 (shown in FIG. 6) determines 174 whether the player has become eligible to be awarded a feature game (according to whether the relevant feature game trigger condition is met). If not, additional game play is initiated 172. However, if the player has become eligible to be awarded a feature game, feature game controller 150 sets 176 an initial number of feature game reels according to the feature game trigger condition. More specifically, in the exemplary embodiment, controller 150 sets one reel for every scatter symbol constituting the trigger condition. Game controller 14 then determines 178 whether an ante bet has been made. If no ante bets were made, feature game controller 150 sets 180 the initial number of game rounds for the feature game to seven and display controller 140 displays the Bonus Levels of Table 1 for player information. However, if an ante bet has been made, however, feature game controller 150 sets 182 the initial number of game rounds for the feature game to 15 and display controller 140 displays the Bonus Levels of Table 2 for player information.

In both cases (i.e. whether or not an ante bet was made), a game round of the feature game is conducted 184 by feature game controller 150. Outcome determiner 144 then determines 186 the outcome of that game round and, if an award is due to the player (in the form either of a Bonus Level of a credit prize (or both), where that award is made 188, after which feature game controller 150 determines 190 whether the last game round of the feature game has been completed. If no award is due 186, game play continues.

If feature game controller 150 determines that the last game round of the feature game has not been completed (either because the initial number of game rounds has not yet been completed, or because that initial number augmented by an award made at step 188 has not yet been completed), processing returns to step 184. Otherwise, processing continues and outcome determiner 144 determines 192 the outcome of the feature game. Prize awarder 158 awards 194 any prize due to the player according to the feature game outcome. Processing then ends.

It will be appreciated that other features known in electronic gaming machines and the games provided thereby can be advantageously and synergistically combined with the features described above.

Modifications and variations as would be apparent to a skilled addressee are deemed to be within the scope of the present invention.

In the claims that follow and in the preceding description of the invention, except where the context requires otherwise owing to express language or necessary implication, the word “comprise” or variations such as “comprises” or “comprising” is used in an inclusive sense, that is, to specify the presence of the stated features but not to preclude the presence or addition of further features in various embodiments of the invention.

Further, any reference herein to prior art is not intended to imply that such prior art forms or formed a part of the common general knowledge in other country.

What is claimed is:

1. An electronic gaming device comprising:

at least one memory device; and at least one processor executing instructions stored on the at least one memory device, which, when executed by the at least one processor, cause the at least one processor to:

cause display, on a display device by a display controller, of an electronic base game including a plurality of base reels;

determine, by an outcome determiner having received a first input from a random number generator (RNG), an outcome for the electronic base game that satisfies a feature game trigger condition;

cause display, by a feature game controller on the display device, of a replacing of each of a subset of the plurality of base reels with a feature game reel of a plurality of feature game reels, each base reel of the subset contributing to the feature game trigger condition in the outcome of the electronic base game;

cause display, by the feature game controller on the display device, a feature game by causing each feature game reel replacing the subset of the plurality of base reels to appear to spin during the feature game, wherein each feature game reel is displayed with a first background area;

cause, by the feature game controller, one or more remaining reels not included in the subset of the plurality of base reels that are displayed on the display device to include a second background area that visually appears different from the first background area to present the one or more remaining reels as inactive reels during the feature game;

determine, by the outcome determiner having received a second input from the RNG, a feature game outcome;

identify an enhancement data structure stored in a register of the at least one memory device, the enhancement data structure including a plurality of hierarchical levels each identifying at least one enhancement for the feature game;

determine, by the feature game controller, a subset of active levels from the enhancement data structure based at least in part on a number of feature game reels used in the feature game and the outcome of the feature game;

apply, by the feature game controller, one or more enhancements from the subset of active levels to the feature game; and cause display, on the display device, of the one or more enhancements.

2. The electronic gaming device of claim 1, wherein the instructions further cause the at least one processor to cause display, by the display controller, of the feature game on the plurality of feature game reels, wherein a number of the plurality of feature game reels is based upon a quantity of trigger symbols associated with the outcome for the electronic base game.

3. The electronic gaming device of claim 1, wherein the one or more enhancements comprises at least one of a multiplier, a number of wild symbols, or increasing an output amount associated with at least one displayed symbol.

4. The electronic gaming device of claim 1, wherein the instructions further cause the at least one processor to:

determine, by the feature game controller, a number of game rounds for the feature game;

in response to determining the feature game outcome, determine whether any game rounds remain; and when no game rounds remain, display, by the display controller, an end of the feature game.

5. The electronic gaming device of claim 1, wherein the one or more enhancements comprises an additional number of game rounds.

6. The electronic gaming device of claim 1, wherein a bonus level trigger condition of a plurality of bonus level trigger conditions stored in the at least one memory device is satisfied based upon the feature game outcome, and wherein the instructions further cause the at least one processor to:

determine, by the outcome determiner, a second feature game outcome;

based upon the second feature game outcome, determine, by the feature game controller, that a second bonus level trigger condition of the plurality of bonus level trigger conditions stored in the at least one memory device is satisfied;

based upon the second bonus level trigger condition, unlock, by the feature game controller, a second level of the plurality of hierarchical levels stored in the enhancement data structure of the at least one memory device;

determine, by the outcome determiner, a second enhancement to be applied to the feature game, wherein the second enhancement is determined based at least in part upon the number of feature game reels and the second level; and cause a value of the second enhancement to be presented by causing the second enhancement to be added to the credit display shown on the display device.

7. A non-transitory computer-readable storage medium with instructions stored thereon that, when executed by at least one processor, cause the at least one processor to:

cause display, via a display device, of an electronic base game including a plurality of base reels;

cause display, via the display device, of an outcome for the electronic base game, based on an outcome determined by an outcome determiner based on a first output from a random number generator (RNG) that satisfies a feature game trigger condition;

cause each of a subset of the plurality of base reels to be replaced with feature game reel of a plurality of feature game reels, each base reel of the subset contributing to the feature game trigger condition in the outcome of the electronic base game, wherein each feature game reel is displayed with a first background area;

cause one or more remaining reels not included in the subset of the plurality of base reels that are displayed on the display device to include a second background area that visually appears different from the first background area to indicate the one or more remaining reels are inactive reels during the feature game;

initiate, on the display device, a feature game by causing each feature game reel replacing the subset of the plurality of base reels to appear to spin during the feature game;

cause display, via the display device, of a feature game outcome based upon a second output from the RNG;

identify an enhancement data structure stored in a register of the medium, the enhancement data structure including a plurality of hierarchical levels each identifying at least one enhancement for the feature game;

determine, by the feature game controller, a subset of active levels from the enhancement data structure based at least in part on a number of feature game reels used in the feature game and the outcome of the feature game;

apply, by the feature game controller, one or more enhancements from the subset of active levels to the feature game; and cause display, via the display device, of the one or more enhancements.

8. The non-transitory computer-readable storage medium of claim 7, wherein the instructions further cause the at least one processor to cause the level to be unlocked.

9. The non-transitory computer-readable storage medium of claim 7, wherein the instructions further cause the at least one processor to cause display, via the display device, of the feature game on the plurality of feature game reels, wherein a number of the plurality of feature game reels is based upon a quantity of trigger symbols associated with the outcome for the electronic base game.

10. The non-transitory computer-readable storage medium of claim 7, wherein the one or more enhancements comprises at least one of a multiplier, a number of wild symbols, or increasing an output amount associated with at least one displayed symbol.

11. The non-transitory computer-readable storage medium of claim 7, wherein the instructions further cause the at least one processor to:

determine a number of game rounds for the feature game;

in response to causing display of the feature game outcome, determine whether any game rounds remain for the feature game; and when no game rounds remain for the feature game, cause display, via the display device, of an end of the feature game.

12. The non-transitory computer-readable storage medium of claim 7, wherein the one or more enhancements comprises an additional number of game rounds.

13. The non-transitory computer-readable storage medium of claim 7, wherein a bonus level trigger condition of a plurality of bonus level trigger conditions is satisfied based upon the feature game outcome, and wherein the instructions further cause the at least one processor to:

cause display, via the display device, of a second feature game outcome;

based upon the second feature game outcome, determine that a second bonus level trigger condition of the plurality of bonus level trigger conditions is satisfied;

based upon the second bonus level trigger condition, cause display, via the display device, of a second level of the plurality of levels stored in the enhancement data structure being unlocked;

cause display, via the display device, of a second enhancement to be applied to the feature game, wherein the second enhancement is determined based at least in part upon the number of feature game reels used in the feature game and the second level; and cause display, via the display device, of the second enhancement.

14. A method of electronic gaming implemented by at least one processor in communication with at least one memory, the method comprising:

causing display, via a display device, of an electronic base game including a plurality of base reels;

causing display, via the display device, of an outcome for the electronic base game that satisfies a feature game trigger condition, based on an outcome by an outcome determiner;

causing each of a subset of the plurality of base reels to be replaced with a feature game reel of a plurality of feature game reels, each base reel of the subset contributing to the feature game trigger condition in the outcome of the electronic base game, wherein each feature game reel is displayed with a first background area;

causing one or more remaining reels not included in the subset of the plurality of base reels that are displayed on the display device to include a second background area that visually appears different from the first background area to indicate the one or more remaining reels are inactive reels during the feature game;

initiating, on the display device, a feature game by causing each feature game reel replacing the subset of the plurality of base reels to appear to spin during the feature game;

causing display, via the display device, of a feature game outcome;

identifying an enhancement data structure stored in a register of the at least one memory, the enhancement data structure including a plurality of hierarchical levels each identifying at least one enhancement for the feature game;

determining, by the feature game controller, a subset of active levels from the enhancement data structure based at least in part on a number of feature game reels used in the feature game and the outcome of the feature game;

applying, by the feature game controller, one or more enhancements from the subset of active levels to the feature game; and causing display, via the display device, of the one or more enhancements.

15. The method of claim 14, further comprising unlocking the level.

16. The method of claim 14, further comprising causing display, via the display device, of the feature game on the plurality of feature game reels, wherein the number of the plurality of feature game reels is based upon a quantity of trigger symbols associated with the outcome for the electronic base game.

17. The method of claim 14, wherein the one or more enhancements comprises at least one of a multiplier, a number of wild symbols, or increasing an output amount associated with at least one displayed symbol.

18. The method of claim 14, further comprising:

determining a number of game rounds for the feature game;

in response to causing display of the feature game outcome, determining whether any game rounds remain for the feature game; and when no game rounds remain for the feature game, causing display, via the display device, of an end of the feature game.

19. The method of claim 14, wherein a bonus level trigger condition of a plurality of bonus level trigger conditions stored in the at least one memory is satisfied based upon the feature game outcome, the method further comprising:

causing display, via the display device, of a second feature game outcome;

based upon the second feature game outcome, determining that a second bonus level trigger condition of the plurality of bonus level trigger conditions is satisfied;

based upon the second bonus level trigger condition, causing display, via the display device, of a second level of the plurality of levels stored in the enhancement data structure being unlocked;

causing display, via the display device, of a second enhancement to be applied to the feature game, wherein the second enhancement is determined based at least in part upon the number of feature game reels and the second level; and causing display, via the display device, of the second enhancement.

* * * * *